United States Patent [19]

Horino

[11] Patent Number: 5,021,896
[45] Date of Patent: Jun. 4, 1991

[54] FAST SEARCH DEVICE IN A MAGNETIC RECORDING AND REPRODUCING DEVICE

[75] Inventor: Mamoru Horino, Hamamatsu, Japan

[73] Assignee: Yamaha Corporation, Hamamatsu, Japan

[21] Appl. No.: 219,043

[22] Filed: Jul. 14, 1988

[30] Foreign Application Priority Data

Jul. 16, 1987 [JP] Japan .................. 62-178088

[51] Int. Cl.$^5$ .................. G11B 5/53; G11B 15/467
[52] U.S. Cl. .................. 360/70; 360/72.2; 360/73.05
[58] Field of Search .................. 360/8–10.3, 360/70, 72.1, 72.2, 73.05, 73.06, 73.08, 75, 73.06, 77.13–77.15

[56] References Cited

U.S. PATENT DOCUMENTS

| | | | |
|---|---|---|---|
| 4,626,936 | 2/1986 | Yoshino | 360/70 |
| 4,636,874 | 1/1987 | Hoogendoorn et al. | 360/10.2 |
| 4,688,115 | 8/1987 | Takahasi et al. | 360/70 |

Primary Examiner—Aristotelis M. Psitos
Assistant Examiner—Steven R. Garland
Attorney, Agent, or Firm—Spensley Horn Jubas & Lubitz

[57] ABSTRACT

A magnetic recording and reproducing device such as an R-DAT performs fast search for detecting a desired reproducing position during fast feeding or rewinding of recorded tape. The magnetic recording and reproducing device comprises a rotary head incorporating a rotary drum for recording and reproducing an input signal by tracing a magnetic tape, a rotary drum drive circuit for driving the rotary drum for rotation, a tape reel drive circuit for driving a tape reel for running a magnetic tape and a relative speed detection circuit for detecting relative speed between the magnetic tape and the rotary head. The rotary drum is driven in such a manner that, upon receiving a fast search order, the relative speed substantially becomes a predetermined speed without increasing the tape speed. After reaching of the relative speed substantially to the predetermined speed, the rotation speed of the rotary drum or the tape reel is changed gradually to a speed used during fast searching and the rotation speed of the tape reel or the rotary drum is changed against the change in the rotary drum or the tape reel after reaching of the relative speed to the predetermined speed while maintaining the relative speed substantially at the predetermined speed. The device can read information for fast search such as start ID, music number and time data recorded on the tape is a stable manner from the start of the search.

8 Claims, 7 Drawing Sheets

FAST SEARCH DEVICE IN A MAGNETIC RECORDING AND REPRODUCING DEVICE

BACKGROUND OF THE INVENTION

This invention relates to a fast search device in a magnetic recording and reproducing device such as an R-DAT (rotary head type digital audio tape recorder) performing fast search for detecting a desired reproducing position during fast feeding or rewinding of a recorded tape and, more particularly, to a fast search device of this type capable of reading information for fast search (i.e., start ID, music number, time data etc.) recorded on the tape in a stable manner from the start of the search.

The R-DAT is a device which converts analog signals such as an audio signal into PCM signals, records the PCM signals on a magnetic tape and reproduces the same.

Figure 2:
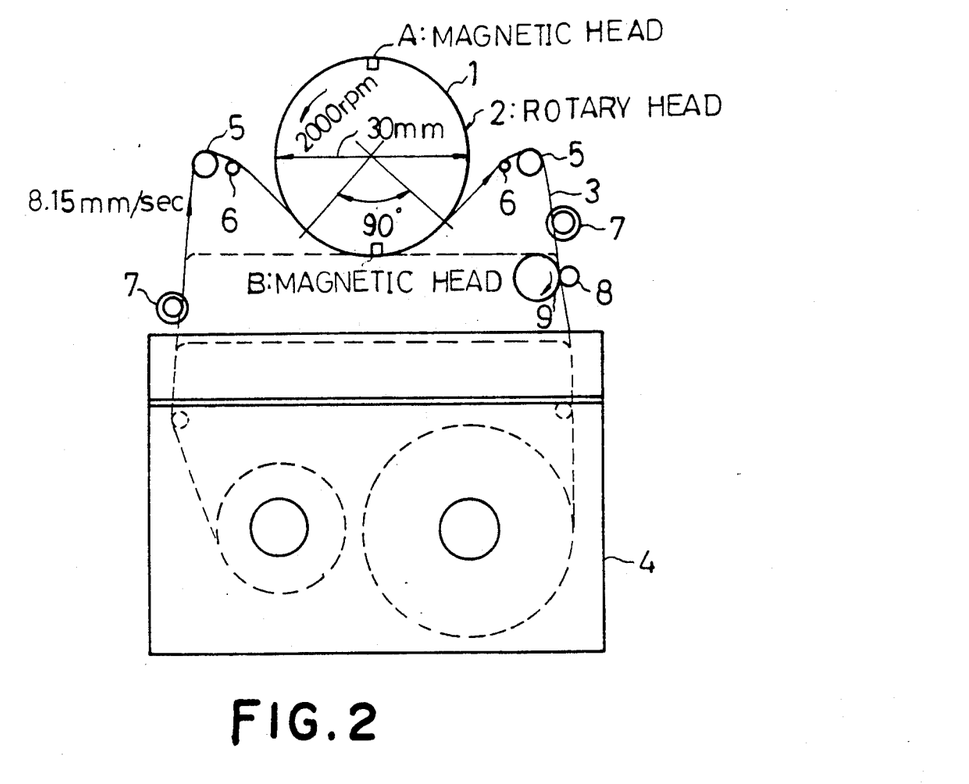
FIG. 2 is a view showing the mechanism of the R-DAT.

As shown in FIG. 2, the device comprises a rotary drum 2 having two magnetic heads A and B separated by 180 degree interval on the circumferential surface of a cylinder 1. A tape 3 is loaded from a cassette housing 4 with a vertical post 5 or with an inclined post 6, wound on the circumferential surface of the rotary drum 2 for 90 degrees, supported by a fixed guide 7, and run by a capstan 8 and a pinch roller 9.

The diameter of the rotary drum 2 is 30 mm, and the winding angle for the tape is 90 degrees. For recording and reproduction, at the mode I which is usually used, the rate of the rotary drum 2 is 2,000 rpm (circumferential speed: 3.14 m/sec) and the speed of the tape 3 at 8.15 mm/sec in the direction identical to that of the rotary drum 2. The relative speed of the drum 2 as against the tape 3 is 3.13 m/sec.

Figure 3:
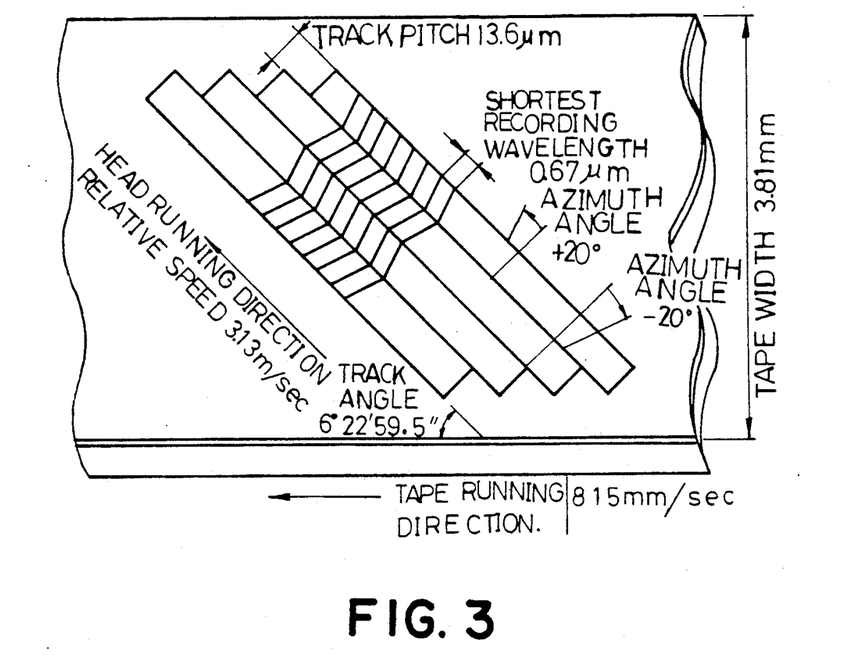
FIG. 3 shows a tape format used for the R-DAT.

The recording system with R-DAT is a helical scanning azimuth recording. Its tape format as shown in FIG. 3 defines with the track angle of 6° 22′ 59.5″ (during running of the tape) and azimuth angle of ±20° with the tracks alternately traced by two heads A and B.

In a track format, audio data are recorded at the center of a PCM region in the longitudinal direction of the track, and sub-codes and control signals such as ATF (automatic track finding) are recorded on both sides thereof.

The PCM region comprises 128 blocks each of which has recording regions for a block synchronizing (indicating the starting position of the block), ID (identification) code, block address, parity check code, and audio data. At the mode I, audio data uses 2's complement codes of quantization bit of 16 bits of the sampling frequency of 48 kHz, and the PCM data is divided into 8 bits in higher order and 8 bits of lower order, modulated from 8 bits into 10 bits (8–10 modulation) and recorded in 10 bits.

Figure 4:
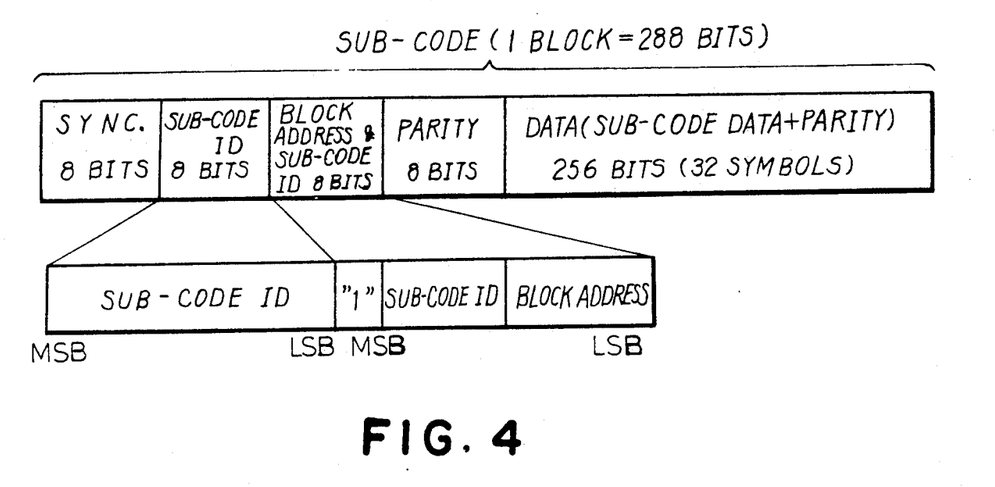
FIG. 4 shows a format of sub-code region (for one block)

In the sub-code region (8 blocks), data such as start ID, music number and time data are recorded. An example of a format in the sub-code region (for one block) is shown in FIG. 4. The start ID is recorded by recording "1" for 9 seconds consecutively at the beginning of a music. By detecting this start ID, fast search designating a specified number of music counted from the current position is enabled. It is also possible to perform fast search depending upon absolute position information such as music number and time data.

Figure 5:
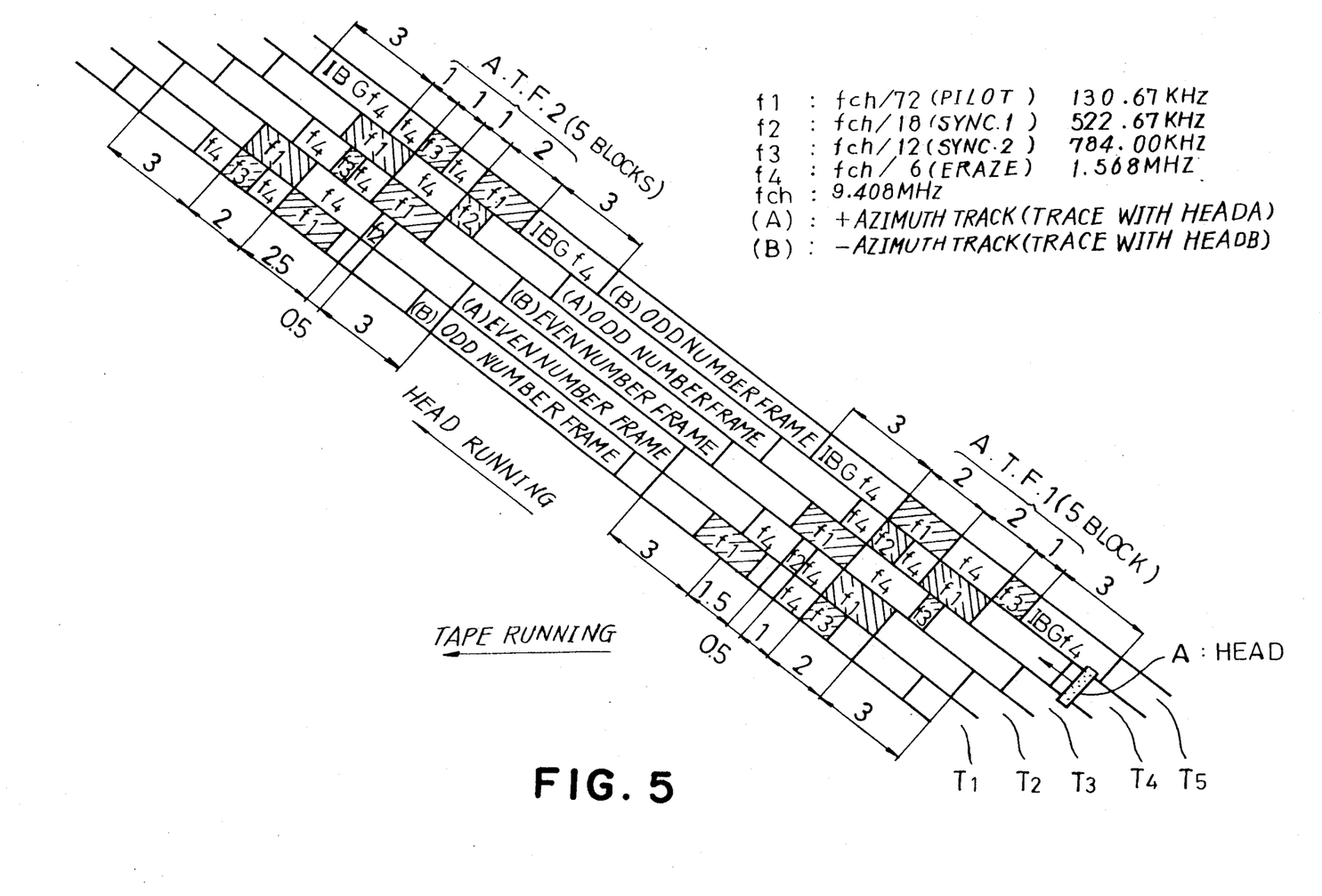
FIG. 5 shows a format of ATF region.

For tracking control during reproducing in the R-DAT, an automatic tracking system with ATF is employed. ATF system detects and compares crosstalks from two adjacent tracks by ATF signals (FIG. 5) recorded on the tracks, and controls the speed of the capstan motor for running tape so as to make crosstalks identical. By this arrangement, the head A is caused to trace a track whose azimuth is +20° (hereinafter referred to as A track) and the head B is caused to trace a track whose azimuth is −20° (hereinafter referred to as B track). These heads A and B can respectively trace a width which is about one and half times each track width.

In a magnetic recording and reproducing device such as R-DAT, it will be very convenient if information recorded on the tape can be reproduced even partially during fast feeding (feeding of the tape at a speed which is higher than a normal playback speed) or rewinding (feeding of the tape in a reverse direction to the normal playback direction).

In an R-DAT, for example, it is important for designing the system as a convenient one to have capability of reading data such as present music number and time information recorded on the sub-code region during search (i.e., operation for detecting a desired music number or position in the music). Particularly, in fast search which is conducted at a high speed such as 200 times as fast as the normal speed, it will be extremely difficult to detect a desired tape position unless such data can be read in a stable manner.

Figure 6:
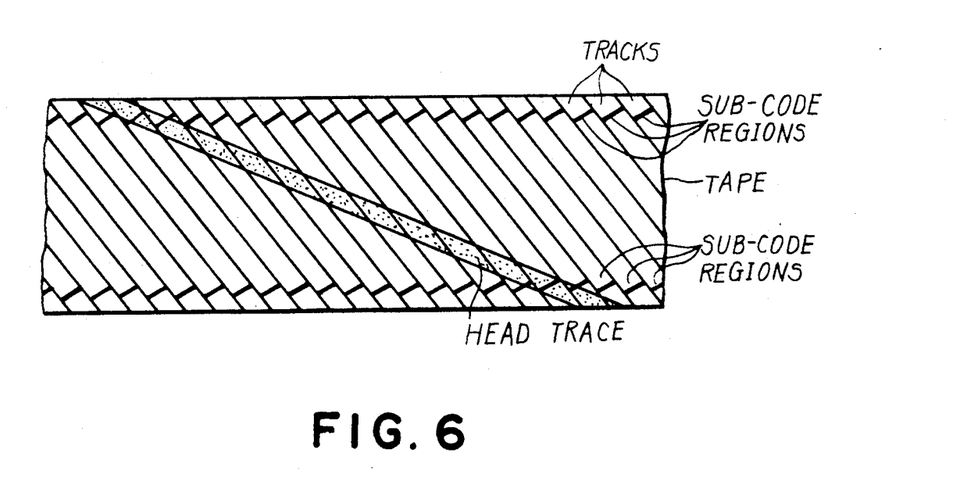
FIG. 6 is a view showing head trace during fast searching in the R-DAT.

In fast search in an R-DAT, the head traces plural tracks, crossing these tracks obliquely as shown in FIG. 6 and passes over a sub-code region of one of these tracks in one crossing. If the relative speed between the head and tape is deviated largely from predetermined relative speed (3.13 m/sec in the case of R-DAT), reproduction of clock cannot be made even if a signal is obtained from the head and, as a result, a sub-code cannot be read. For reading a sub-code, it is necessary for the relative speed between the tape and head to be within a range in which clock can be reproduced (i.e., range in which the relative speed can be subjected to the PLL control for reproduction of clock).

In the prior art device, in a case where fast search is conducted at a speed of, e.g., 200 times as fast as the normal rotation speed, the rotation speed of the rotary drum and rough speed of the tape for realizing the 200 times speed are respectively set (e.g., 3026 rpm for the rotary drum and 1.63 m/sec. for the tape) and, using these values as target values, the rotation speed of the tape reel is finely adjusted after reaching of the target values of the drum motor and the reel motor thereby obtaining the predetermined relative speed.

According to this prior art start control for fast search, a control for matching the relative speed to a predetermined speed is not made in a transient state in starting the drum motor and the reel motor and, for this reason, a signal cannot be read in the transient state. Accordingly, when fast search is conducted designating a certain music number from the current position by utilizing the start ID, the start ID may pass during this transient state so that the start ID is overlooked (since the start ID passes only in 0.9 second in a music of, e.g., 3 minutes if fast search is conducted at a speed 200 times as fast as the normal speed, possibility of such overlooking of the start ID is very high) with a result that a music which is different from the designated one is located. In fast search depending upon absolute position information such as music number and time data also, the target position tends to pass during the transient state and, in this case, search must be made again by running the tape reversely resulting in taking much time for the search.

It is, therefore, an object of the invention to provide a fast search device in a magnetic recording and reproducing device which has eliminated the above described disadvantage of the prior art fast search device and is capable of reading position information for fast search recorded on the tape even in a transient state at the beginning of the search.

SUMMARY OF THE INVENTION

For achieving the above object of the invention, the fast search device according to the invention comprises a rotary head incorporating a rotary drum and a plurality of heads provided in this rotary drum for recording and reproducing an input signal by tracing a magnetic tape, rotary drum drive means for driving said rotary drum for rotation, tape reel drive means for driving a tape reel for running a magnetic tape, and relative speed detection means for detecting relative speed between the magnetic tape and the rotary head, said rotary drum drive means and said tape reel drive means driving, upon receiving a fast search order, the rotary drum and the tape reel in such a manner that said rotary drum is driven so that the relative speed substantially becomes a predetermined speed without increasing the tape speed, the rotation speed of said rotary drum or said tape reel, after reaching of the relative speed substantially to the predetermined speed, is changed gradually to a speed used during fast searching, and the rotation speed of said tape reel or said rotary drum is changed against the change in said rotary drum or said tape reel after reaching of the relative speed to the predetermined speed while maintaining the relative speed substantially at the predetermined speed.

According to the invention, when a fast search order has been received, the rotary drum is driven so that the relative speed will become substantially the predetermined speed without increase of the tape speed and, after the relative speed has substantially reached the predetermined speed, the rotation speed of the rotary drum is changed gradually to the speed for the fast search. Against this change in the speed of the rotary drum, the rotation speed of the tape reel is changed while maintaining the relative speed substantially to the predetermined speed and reaches the desired speed.

By this arrangement, even in a transient state at the beginning of the search, the relative speed between the rotary drum and tape is controlled to substantially the predetermined speed so that information on the tape can be read and such erroneous operations as location of a different music from the designated one and passing over of the designated position can be effectively prevented.

The invention is applicable not only to an R-DAT but also to other rotary head type magnetic recording and reproducing device such as video tape recorders.

A preferred embodiment of the invention will now be described with reference to the accompanying drawings.

BRIEF DESCRIPTION OF THE DRAWINGS

In the accompanying drawings.

DESCRIPTION OF PREFERRED EMBODIMENT

A preferred embodiment of the invention will now be described.

In this embodiment, the invention is applied to fast searching in an R-DAT. In this embodiment, a pilot signal is used for detecting a relative speed. This pilot signal is easy to discriminate from other signals since it is recorded at the lowest frequency of all signals recorded on the tape. Besides, even if there is crosstalk between adjacent tracks, pilot signals in the adjacent tracks are never detected simultaneously according to the format so that they do not interfere each other. Since pilot signals are of low frequency, azimuth loss is small and therefore a pilot signal on the B track can be also read with the head A and a pilot signal on the A track can be also read with the head B. Furthermore, pilot signals are recorded on the tape for a longer period of time than synchronizing signals in ATF signals so that the pilot signals are easier to detect. For these reasons, an accurate detection of relative speed can be expected by utilizing pilot signals.

Figure 7:
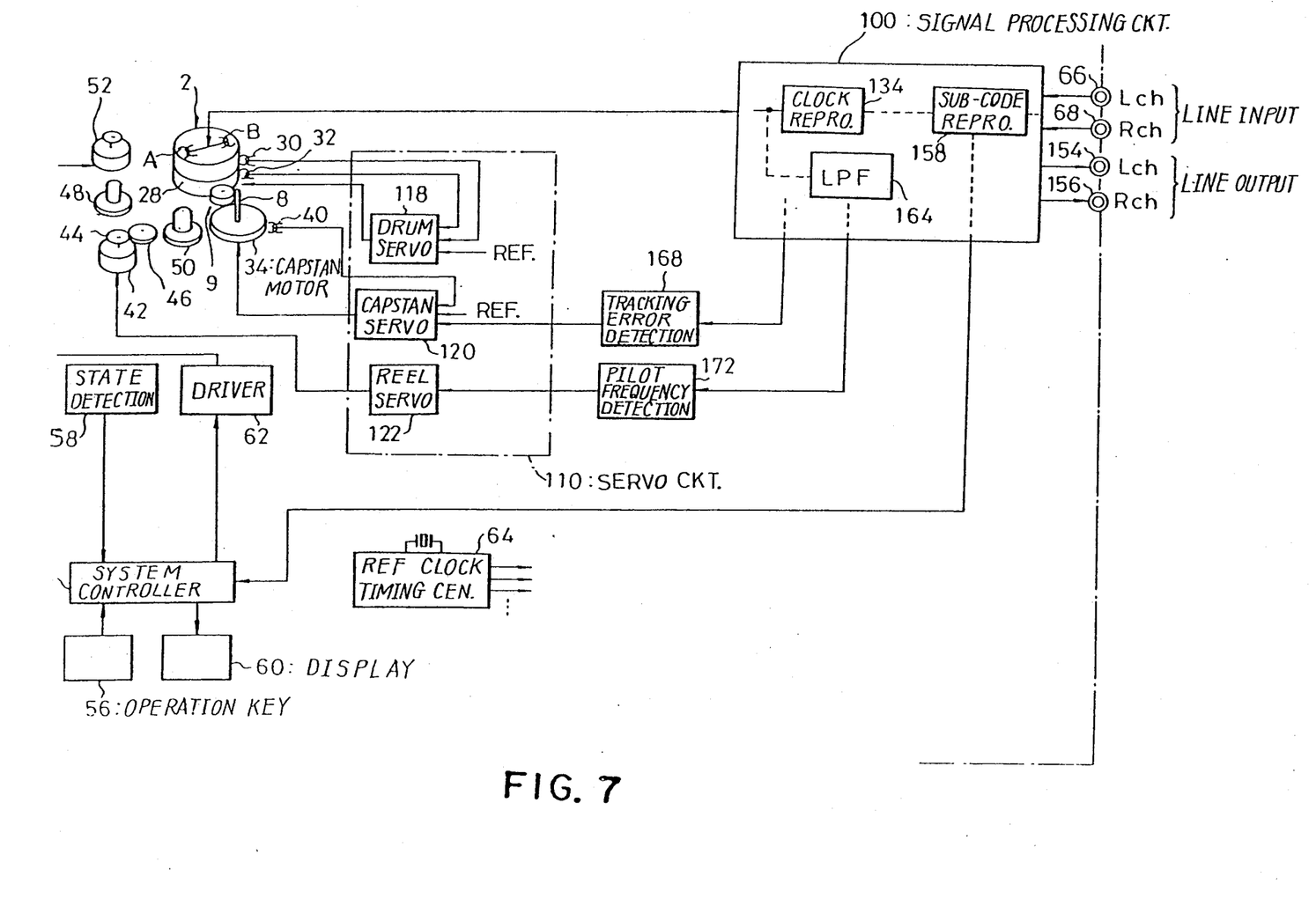
FIG. 7 is a block diagram showing general construction of the R-DAT to which this invention has been applied.

FIG. 7 shows a general construction of R-DAT to which this invention has been applied.

A system controller 54 comprises a microcomputer and controls operations at each section in accordance with contents of commands issued by a keyboard 56 or detection section 58 inside the system, displaying necessary items such as music number and time on a display 60.

A reference clock/timing generation circuit 64 generates various reference clocks and timing signals to be used in the signal processing system or servo processing system by quartz oscillation outputs.

A rotary drum 2 has two magnetic heads A and B arranged on the circumferential surface of a cylinder 1 at an interval of 180 degrees. The drum 2 is driven by a drum motor 28. The drum 2 is further provided with an FG (frequency generator) 30 for speed detection and a PG (phase generator) 32 for reference rotational position detection.

A capstan motor 34 comprises a motor shaft comprising a capstan 8, and a pinch roller 9 abuts on the capstan 8 to control and run the tape during reproduction and recording. An FG 40 is provided on the capstan motor 34 for speed detection.

A reel motor 42 drives reel tables 48 and 50 via pulleys 44 and 46 to wind the tape. Fast feeding, rewinding and fast search are effected by releasing engagement between the pinch roller 9 and the capstan 8 and driving the reel motor 42. During fast feeding, the pulley 46 is caused to abut against the reel table 50 and the reel table 50 is driven whereas during rewinding, the pulley 46 is caused to abut against the reel table 48 and the reel table 48 is driven. A loading motor 52 loads casettes and tapes, and is actuated by a driver 62 responsive to a command from the system controller 54.

A signal processing circuit 100 executes a signal reproducing processing in which a signal read by the heads A and B is digitalized, demodulated and D/A converted and left and right channel signals are provided to output terminal 154 and 156 and sub-code information, ATF signal and other signals are reproduced as well as a signal recording processing in which the left and right channel signals from input terminals 66 and 68 are A/D converted and modulated, added with control signals such as ATF signal and sub-code information and supplied to the heads A and B for recording of these signals on the tape.

A servo circuit 110 performs rotation control of the drum 2, capstan motor 34 and reel motor 42. In the servo circuit 110, a drum servo circuit 118 compares revolution detection signals from the FG 30 and the PG 32 with a reference signal thereby effecting rotation control of the drum motor 28. A capstan servo circuit 120 controls rotation of the capstan 8 duirng feeding of the tape at the normal speed (8.15 mm/s) or fast playback. In the capstan servo circuit 120, a rotation detection signal from the FG 40 is compared with a reference signal. This capstan servo circuit 120 is not operated during fast search.

A reel servo circuit 122 normally drives the reel motor 42 so as to prevent slackening of the tape and, during fast searching, this circuit 122 is servo controlled for maintaining the pilot frequency reproduced from the tape at a predetermined value so as to bring the relative speed between the tape and the head to the predetermined speed.

Fast search will be described more fully below.

During fast searching, the capstan 8 is released from engagement with the pinch roller 9 and the reel 48 or 50 is driven by the reel motor 42 at a high speed (e.g., a speed which is 200 times as fast as the normal speed) to feed the tape quickly or rewind it in a state in which the tape is in contact with the rotary drum 2. During this mode, signals recorded on the tape are obtained from the rotary drum 2. If the signal processing circuit 100 is in a condition in which it can perform signal processing, the sub-code reproduction circuit 158 detects data such as start ID, music number and time information from the sub-code information in the reproduced signals and the system control 54 compares these data with a predetermined target position to control fast feeding or rewinding of the tape whereby fast searching of the target position can be performed.

As described before, it is necessary, for reproducing sub-code information from a reproduced signal from the rotary drum 2, to control the relative speed between the tape and the rotary drum 2 so that it is maintained within a range not deviating largely from a predetermined speed (3.13 m/sec), i.e., within a range in which the relative speed can be subjected to the PLL control for reproduction of clock. For effecting this control of the relative speed, the pilot signal f1 in the ATF signals is utilized. Since the pilot signal f1 is recorded at 130.67 KHz, the tape speed is controlled so that the pilot signal f1 can be detected at this predetermined frequency during fast searching.

In FIG. 7, the pilot signal f1 is detected by the low-pass filter 164. Since the pilot signal f1 is of the lowest frequency of all signals recorded on the tape, it can be readily detected by the low-pass filter 164. The frequency of this detected pilot signal f1 also is subject to variation in response to variation in the relative speed between the head and tape. Since, however, synchronizing signal f2 which is of the next lowest frequency to the pilot signal f1 has frequency of 522.67 KHz which is four times as high as the pilot signal f1, the pilot signal f1 can be discriminated from other signals and extracted without fail despite some frequency variation due to variation in the relative speed by setting the cut-off frequency of the low-pass filter 164 at about 260 KHz (or by constituting the low-pass filter 164 as a band-pass filter having passing band in the order of 60–260 KHz).

Figure 8:
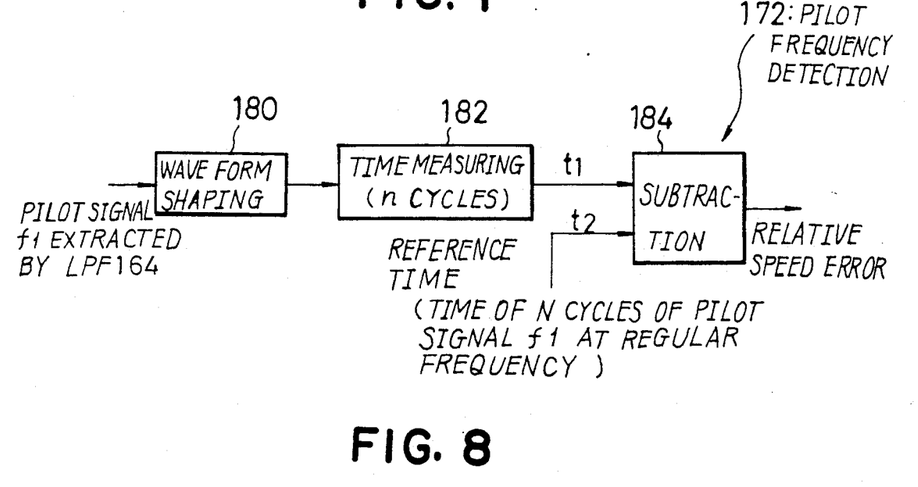
FIG. 8 is a block diagram showing a specific example of a pilot frequency detection circuit 172 in FIG. 7.

The pilot frequency detection circuit 172 detects the frequency of the pilot signal f1 extracted in this manner and detects an error between the detected frequency and the predetermined frequency of 130.67 KHz. More specifically, the pilot frequency detection circuit 172 compares, as shown in FIG. 8 for example, the pilot signal f1 extracted by the low-pass filter 164 with a voltage which is caused to have a desired offset value from zero-cross point by a waveform shaping circuit 180 thereby to shape the waveform of the pilot signal f1, judges the waveshape as effective when the waveshape arrives in m consecutive cycles (e.g., 6 cycles), and then measures time t1 for n cycles (e.g., 5 cycles) among the m cycles of the pilot signal f1 with a time measurer 182. Then, the circuit 172 performs subtraction t2−t1 with a subtractor 184 using reference time t2 which consists of n cycles of the pilot signal f1 at the predetermined frequency and provides an error between the predetermined frequency and the detected pilot signal f1 as a relative speed error in the form of a voltage signal.

The relative speed error signal produced by the pilot signal frequency detection cirucit 172 is applied to the reel servo 122 in FIG. 7 to control the reel motor 42 so that the frequency of the detected pilot signal f1 will become the predetermined frequency and the relative speed thereby will become the predetermined speed of 3.13 m/sec.

When the relative speed is controlled to the predetermined speed, the clock reproduction circuit 134 can reproduce clock from a head output signal. This enables the sub-code reproduction circuit 158 to reproduce sub-code information in the head output signal. The system controller 54 searches for a preset position quickly by controlling fast feeding and rewinding of the tape upon detecting start ID in the sub-code information and counting its number and comparing the counted number with the designated number of music pieces as the target position of fast search (or, in case the music number or time data is designated, comparing music number and time data in the sub-code information).

Figure 1:
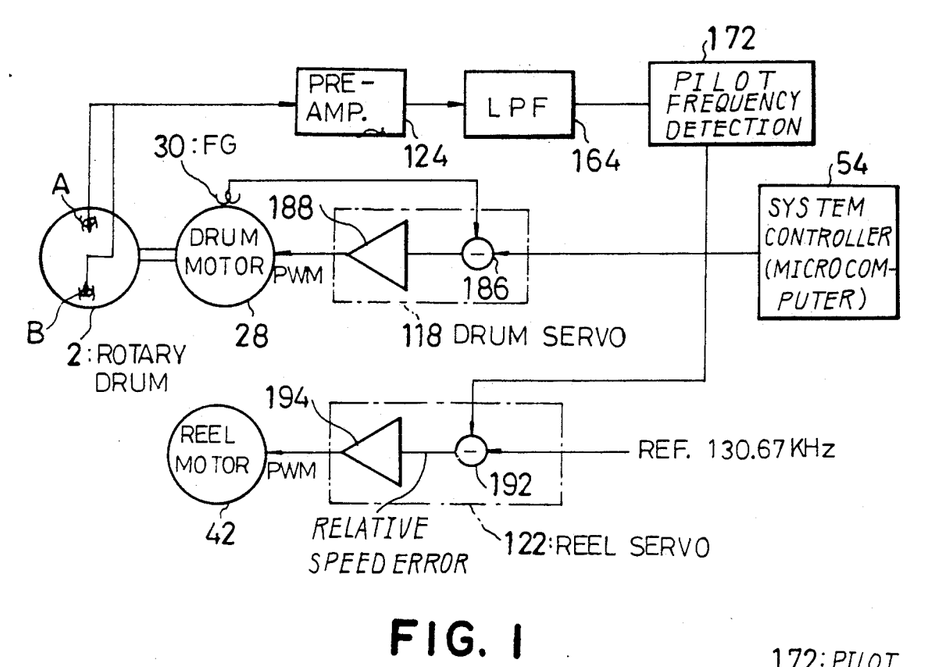
FIG. 1 is a block diagrams showing an embodiment in which this invention is applied to an R-DAT.

A specific example of the drum servo 118 and the reel servo 122 for controlling the relative speed to the predetermined speed on the basis of the relative speed error is shown in FIG. 1. This example is adapted to control the reel servo 122 in accordance with the relative speed error resulting from imparting a rotation order to the drum servo 118 and thereby driving the drum servo 118.

Figure 9:
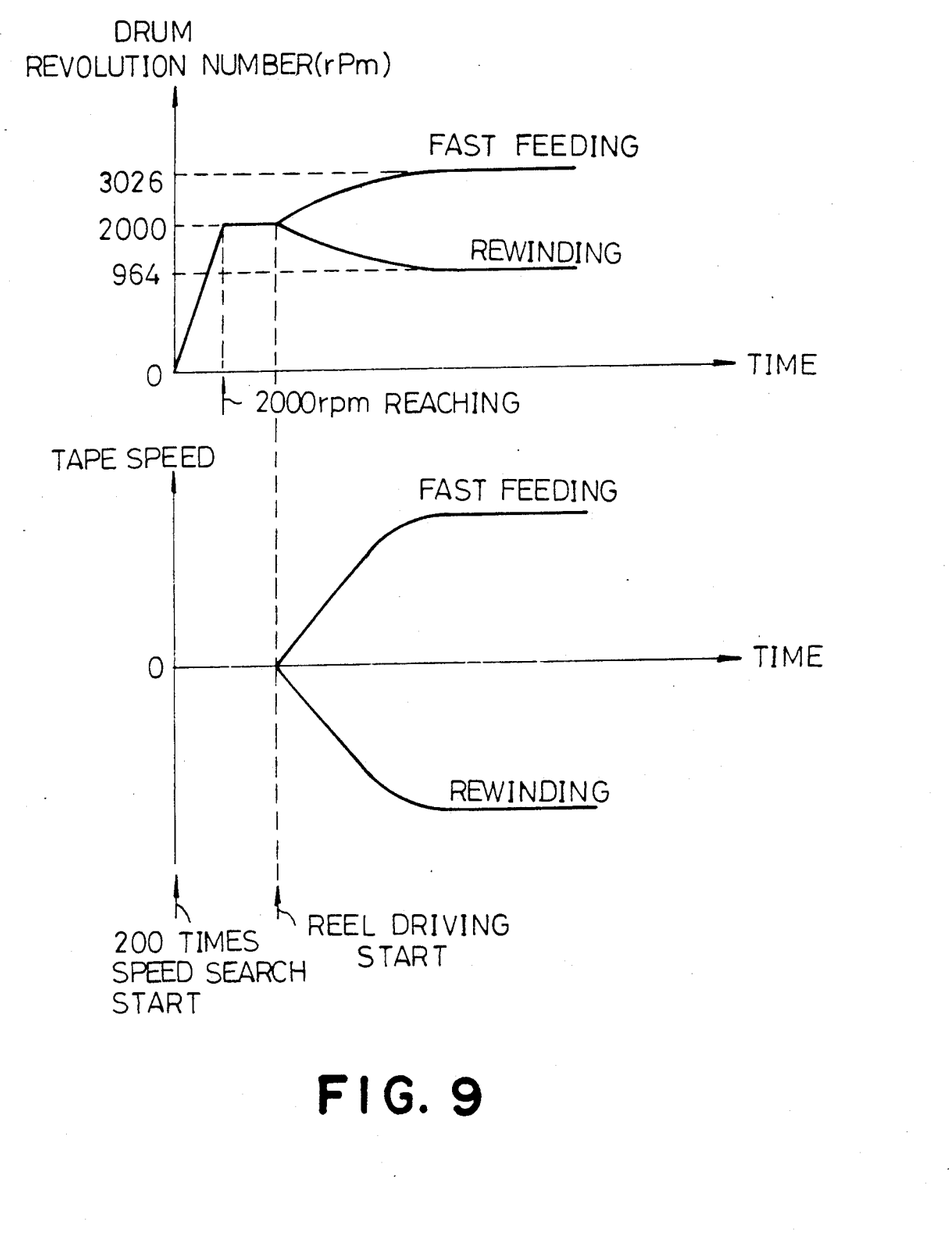
FIG. 9 is a diagram showing an example of state of change in the revolution number of the drum and tape speed in the fast search device in FIG. 1.

Upon receiving fast search command as shown in FIG. 9, the reel motor 42 is stopped and the drum motor 28 is driven rapidly to 2000 rpm. Upon reaching of the drum motor 28 to 2000 rpm, it is substantially the predetermined relative speed so that sub-code information can be read and, accordingly, the speed of the drum motor 28 is changed gradually to a speed used during fast searching (in the case of 200 times speed, 3025 rpm for fast feeding and 964 for rewinding) at a speed change ratio at which the reel motor 42 can follow while maintaining substantially the predetermined relative speed. Simultaneously, the reel motor 42 is caused to change its speed following the drum motor 28 so that the relative speed error will become zero. By this arrangement, sub-code information can be read even in a transient state until reaching the 200 times speed whereby accurate and fast search can be realized.

In FIG. 1, the system controller 54 has, for realizing the above described control, a function for issuing a drum rotation order corresponding to 2000 rpm and arithmetic operation function for gradually changing the drum rotation order in the process of changing the speed from this 2000 rpm to the 200 times speed in forward and reverse rotations thereby being capable of issuing a rotation speed value in accordance with a particular state. These orders are provided in the form of frequency signals corresponding to the respective revolution numbers. In the drum servo 118, this order and the output of the FG 30 are compared in frequency by a comparator 186 and the drum motor 28 is PWM controlled through a drive amplifier 188 so that these will coincide with each other.

In the reel servo 122, the frequency information obtained from the pilot frequency detection circuit 172 is compared in frequency with a reference frequency signal of 130.67 KHz by a comparator 192 and the reel motor 42 is PWM controlled through a drive amplifier 194 so that these will coincide with each other.

Thus, the speed of the reel motor 42 is controlled and the relative speed is controlled to the predetermined speed.

Figure 10:
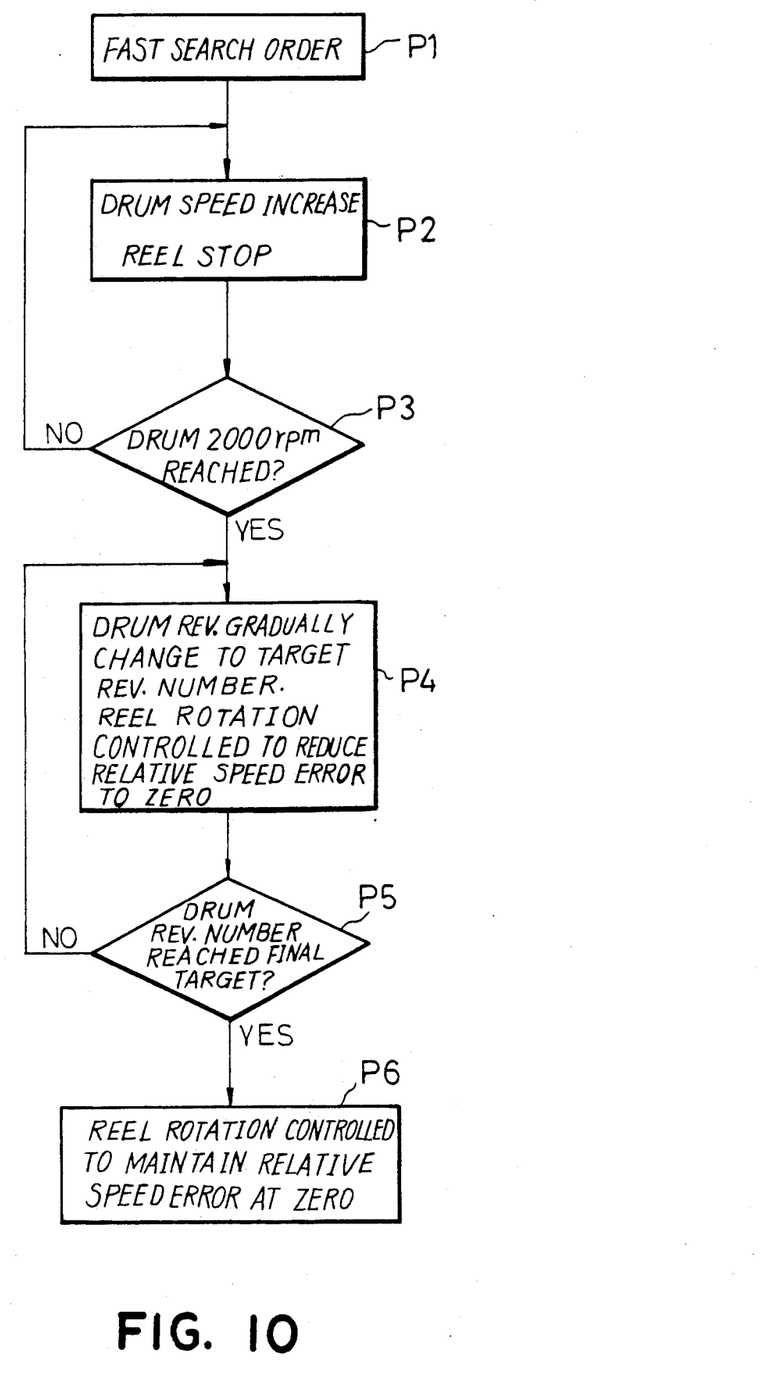
FIG. 10 is a diagram showing an example of flow chart for realizing the control of FIG. 9.

The flow chart of the control by the system control 54 for executing the control of FIG. 9 is shown in FIG. 10. Upon issuing of the fast search order in step P1, the reel motor 42 is stopped and the drum motor 28 is driven with its speed rising rapidly to 2000 rpm in step P2. Then the processing proceeds to step P4 through step P3 and the drum motor 28 is changed in its speed gradually toward the target rotation speed. Simultaneously, a rotation speed order is given to the reel motor 42 so as to reduce the relative speed error to zero (this order is renewed each time the relative speed error is detected) thereby starting the reel servo 122. Since the rotation speed of the drum motor 28 is changed gradually, the reel servo 122 follows this change while maintaining substantially the predetermined relative speed. Therefore, sub-code information can be read even in a transient state in which the rotation speed is changing.

Upon reaching of the speed order to the drum motor 42 to the final target speed, the drum revolution number is stabilized in a state in which the 200 times speed has been realized in step P6 through step P5 and the reel is controlled so that the relative speed error becomes zero. Upon reaching the search target position, the search operation is completed and reproduction is started from this position.

In the above described embodiment, the relative speed error is detected by detecting frequency of the pilot signal. Other method for detecting the relative speed error may of course be employed.

The rotary drum is driven so that the relative speed will become substantially the predetermined speed without increase of the tape speed and, after the relative speed has substantially reached the predetermined speed, the rotation of the rotary drum is changed gradually to the speed for the fast search. Against this change in the speed of the rotary drum, the rotation speed of the tape reel is changed while maintaining the relative speed substantially to the predetermined speed and reaches the desired speed.

In the above described embodiment, the drum rotation speed is set and the relative speed is matched in the reel servo. Conversely, the reel rotation speed may be set and the relative speed may be matched in the drum servo.

In the above described embodiment, the speeds of the drum motor and the reel motor are controlled by duty ratio control using PWM output. The invention is not limited to this but other methods of speed control may be employed. For example, an arrangement may be made so that the output of the FG is frequency-voltage converted and a reference order is provided also as a voltage value for comparing them in voltage and the speeds of the drum motor and the reel motor are controlled by dc voltage value resulting from this comparison.

What is claimed is:

1. A magnetic recording and reproducing device comprising:
   a rotary head incorporating a rotary drum and a plurality of heads provided in this rotary drum for recording and reproducing an input signal by tracing a magnetic tape;
   rotary drum drive means for driving said rotary drum for rotation;
   tape reel drive means for driving a tape reel for running a magnetic tape; and
   relative speed detection means for detecting relative speed between the magnetic tape and the rotary head,
   control means for controlling said rotary drum drive means and said tape reel drive means such that, upon receiving a fast search order, the rotary drum and the tape reel (a) are controlled in such a manner that said rotary drum is driven so that the relative speed substantially becomes a predetermined speed without increasing the tape speed, and (b), after reaching of the relative speed substantially to the predetermined speed, the rotation speed of one of said rotary drum or said tape reel is changed gradually to a speed used during fast searching, and the rotation speed of the other said tape reel or said rotary drum is changed against the change of speed in said rotary drum or said tape reel while maintaining the relative speed substantially at the predetermined speed.

2. A device as defined in claim 1 including a rotary drum servo circuit which receives a rotation reference signal corresponding to a desired rotation speed and drives the rotary drum, wherein the initial drive of said rotary drum, upon receipt of the fast search order, for reaching of the relative speed to substantially the predetermined speed is performed by changing the rotation reference signal to a predetermined value.

3. A device as defined in claim 1 including a rotary drum servo circuit which receives a first rotation reference signal corresponding to a desired rotation speed and drives the rotary drum and a tape reel servo circuit which receives a second rotation reference signal corresponding to a desired rotation speed and drives the reel motor, wherein the gradual change in the rotation speed of said rotary drum or said tape reel to the speed used during fast searching after reaching of the relative speed substantially to the predetermined speed is performed by gradually changing the first rotation reference signal or the second rotation reference signal.

4. A device as defined in claim 1 including a rotary drum servo circuit which receives a first rotation reference signal corresponding to a desired rotation speed and drives the rotary drum and a tape reel servo circuit which receives a second rotation reference signal corresponding to a desired rotation speed and drives the reel motor, wherein the change in the rotation speed of said tape reel or said rotary drum against the change in the rotation speed of said rotary drum or said tape reel after reaching of the relative speed substantially to the predetermined speed while maintaining the relative speed substantially at the predetermined speed is performed by changing the first rotation reference signal or the second rotation reference signal in accordance with the result of detection by said relative speed detection means.

5. A device as defined in claim 1 wherein said magnetic recording and reproducing device is a rotary head digital audio tape device.

6. A device as defined in claim 5 wherein said relative speed detection means detects the relative speed between the magnetic tape and the rotary head by detecting frequency of a pilot signal in an automatic track finding signal recorded in the magnetic tape.

7. A device as defined in claim 6 wherein said relative speed detection means comprises:
   means for extracting a pilot signal in an automatic track finding signal;
   means for measuring time of predetermined cycles of the extracted pilot signal; and
   means for detecting, as the relative speed, difference between the time of the predetermined cycles of the extracted pilot signal at a regular frequency and the time measured by said measuring means.

8. A device as defined in claim 7 wherein the rotary drum drive means includes a motor and the tape reel drum means includes a motor and wherein control of the rotation speeds of the motors is performed by duty ratio control utilizing pulse width modulation technique.

* * * * *